US011023904B1

(12) United States Patent
Johnson et al.

(10) Patent No.: US 11,023,904 B1
(45) Date of Patent: Jun. 1, 2021

(54) MODEL FOR THE COMPETITIVE SEEDING OF OPINIONS IN NETWORKS WITH HYBRID GOSSIP-THRESHOLD DYNAMICS

(71) Applicant: HRL Laboratories, LLC, Malibu, CA (US)

(72) Inventors: Samuel D. Johnson, Santa Monica, CA (US); Kang-Yu Ni, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 241 days.

(21) Appl. No.: 15/944,267

(22) Filed: Apr. 3, 2018

Related U.S. Application Data

(60) Provisional application No. 62/500,454, filed on May 2, 2017.

(51) Int. Cl.
*G06Q 30/02* (2012.01)
*G06F 17/11* (2006.01)
*G06Q 50/00* (2012.01)

(52) U.S. Cl.
CPC ......... *G06Q 30/0201* (2013.01); *G06F 17/11* (2013.01); *G06Q 30/0277* (2013.01); *G06Q 50/01* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 2009/0119173 A1* | 5/2009 | Parsons | G06Q 10/107 705/319 |
| 2012/0233229 A1* | 9/2012 | Steiner | G06Q 30/02 708/132 |
| 2013/0204664 A1* | 8/2013 | Romagnolo | G06Q 30/0203 705/7.32 |
| 2013/0232263 A1* | 9/2013 | Kelly | H04L 43/10 709/224 |
| 2014/0122991 A1* | 5/2014 | Achillopoulos | G06F 40/169 715/230 |

(Continued)

OTHER PUBLICATIONS

Morris H. DeGroot. Reaching a consensus. Journal of the American Statistical Association, 69(345): pp. 118-121, Mar. 1974.

(Continued)

*Primary Examiner* — Kurtis Gills
(74) *Attorney, Agent, or Firm* — Tope-McKay & Associates

(57) ABSTRACT

Described is a system for determining how opinions spread through a network. Opinion dynamics are applied to a network, each node having a corresponding opinion. Each node is described by an active state or an inactive state such that inactive nodes can update their opinions, and active nodes are fixed in their opinion at the time of activation. Inactive nodes can be influenced by both active nodes and inactive nodes. The opinion dynamics proceed in discrete time steps with an influence step for updating each inactive node's opinion, and a stochastic action step for determining whether an inactive node becomes activated. The system identifies how opinions spread through the network using the applied opinion dynamics, resulting in a set of opinion dynamics data. The opinion dynamics data is used to control information that a device or account is allowed to post to social media platform.

16 Claims, 12 Drawing Sheets

(56) References Cited

U.S. PATENT DOCUMENTS

| | | | | |
|---|---|---|---|---|
| 2014/0136624 A1* | 5/2014 | Abhyanker | ............ | G06Q 50/01 |
| | | | | 709/204 |
| 2015/0120717 A1* | 4/2015 | Kim | ...................... | G06F 16/335 |
| | | | | 707/727 |
| 2017/0103402 A1* | 4/2017 | El-Diraby | .......... | G06Q 30/0201 |

OTHER PUBLICATIONS

Sanjeev Goyal, Hoda Heidari, and Michael Kearns. Competitive contagion in networks. Games and Economic Behavior, 2014, pp. 1-22.

Benjamin Golub and Matthew O. Jackson. Naive learning in social networks and the wisdom of crowds. American Economic Journal: Microeconomics, 2(1): pp. 112-149, Feb. 2010.

David Kempe, Jon Kleinberg, and E'va Tardos. Maximizing the spread of influence through a social network. In Proceedings of the ninth ACM SIGKDD international conference on Knowledge discovery and data mining, KDD '03, pp. 137-146, New York, NY, USA, 2003. ACM.

John Nash. Non-cooperative games. Annals of Mathematics, 54(2): pp. 286-295, 1951.

R. Olfati-Saber, J.A. Fax, and R.M. Murray. Consensus and cooperation in networked multi-agent systems. Proceedings of the IEEE, 95(1): pp. 215-233, Jan. 2007.

Charu C. Aggaral and ChengXiang Zhai. A Survey of Text Classification Algorithms. In: Aggarwal C., Zhai C. (eds) Mining Text Data. Springer, Boston, MA, 2012, pp. 163-222.

\* cited by examiner

MODEL FOR THE COMPETITIVE SEEDING OF OPINIONS IN NETWORKS WITH HYBRID GOSSIP-THRESHOLD DYNAMICS

CROSS-REFERENCE TO RELATED APPLICATIONS

This is a Non-Provisional Application of U.S. Provisional Application No. 62/500,454, filed in the United States on May 2, 2017, entitled, "A Model for the Competitive Seeding of Opinions in Networks with Hybrid Gossip-Threshold Dynamics," the entirety of which is incorporated herein by reference.

BACKGROUND OF INVENTION

(1) Field of Invention

The present invention relates to a system for competitive seeding of opinion dynamics in network settings and, more particularly, to a system for competitive seeding of opinion dynamics that incorporates both thresholding and gossip-style behaviors.

(2) Description of Related Art

Competitive seeding models can be used to by a company to maximize the consumption of a consumer product. The DeGroot consensus dynamic (see Literature Reference Nos. 1 and 6 in the List of Incorporated Literature References) describe a discrete-time process in which the state (opinion) of a node at time t is the weighted average of their own opinion at time t−1, and the opinions of their neighboring nodes (i.e., nodes that share edges) at time t−1. This process is used to model simple systems in which nodes begin with arbitrary initial opinions (at time t=0) and, by repeatedly applying the update rule, reach a consensus whereby all nodes share a common opinion in the limit as t→∞. Because the steady-state behavior of this dynamic is defined by a fixed point (with all nodes sharing the same opinion), it is believed that the model described in Literature Reference Nos. 1 and 6 is too simplistic to capture real-world opinion dynamics, where one would expect to observe the persistence of multiple opinions.

Further, a threshold complex diffusion dynamic, such as the one presented by Kempe, Kleinberg, and Tardos in Literature Reference No. 4, models a process in which nodes possess binary states: active or inactive. In addition, each node v has a threshold $0 < \theta_v \leq 1$, which may be a random variable. Some nodes are initialized (at time t=0) to active while all other are initially inactive. At each discrete time step t=1, 2, ..., all nodes that were active at time t−1 remain active, and every inactive node v that has more than a $\theta_v$ fraction of its neighbors active at time t−1 switch to active. The process ends after i) all nodes are activated, or (ii) there is a time step in which no inactive nodes switch to active. The binary state space described is too restrictive for settings involving opinions, as it does not allow for subtle or fractional shifts in opinion. Additionally, this approach requires that the spreading of opinions only goes from active nodes (whose opinions are fixed at the time of activation) to inactive nodes; it does not allow for inactive nodes to influence one another.

Thus, a continuing need exists for a dynamic process that describes how opinions spread throughout a network that is not captured by commonly used threshold dynamics.

SUMMARY OF INVENTION

The present invention relates to a system for competitive seeding of opinion dynamics in network settings and, more particularly, to a system for competitive seeding of opinion dynamics that incorporates both thresholding and gossip-style behaviors. The system comprises one or more processors and a memory having instructions such that when the instructions are executed, the one or more processors perform multiple operations. Opinion dynamics are applied to a network comprising a plurality of nodes, each node having a corresponding opinion. Each node is described by an active state or an inactive state such that inactive nodes can update their opinions, and active nodes are fixed in their opinion at the time of activation. Inactive nodes can be influenced by both active nodes and inactive nodes. The opinion dynamics proceed in discrete time steps, and the opinion dynamics at each time step comprises: an influence step for updating each inactive node's opinion based on a previous opinion of the inactive node and the opinions of neighboring nodes, and a stochastic action step for determining whether an inactive node becomes activated and, if so, to which player does the inactive node commit to as a function of its current opinion. The system identifies how opinions spread through the network using the applied opinion dynamics, resulting in a set of opinion dynamics data. Using the set of opinion dynamics data, the system controls information that a device or account is allowed to post to social media platform.

In another aspect, the influence step updates the opinion of an inactive node to be a weighted sum of the inactive node's previous opinion and an average of the opinions of neighboring nodes.

In another aspect, when the opinion dynamics halt after T time steps, the one or more processors further perform an operation of aggregating the plurality of nodes' opinions into a player utility function.

In another aspect, a commitment utility function specifies that a utility of a player is determined by a fraction of nodes that commit to the player.

In another aspect, a relative opinion utility function specifies that the utility for a player is determined by the sum of relative opinion values held by each of the nodes that are committed to the player at time T.

In another aspect, the opinion spread is related to one of a positive message and a positive image about one of a consumer product and a company.

In another aspect, the identification of opinion spread is used to generate an advertising recommendation strategy.

In another aspect, an advertisement for a consumer product is caused to be displayed to a user on a website.

Finally, embodiments of the present invention also include a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
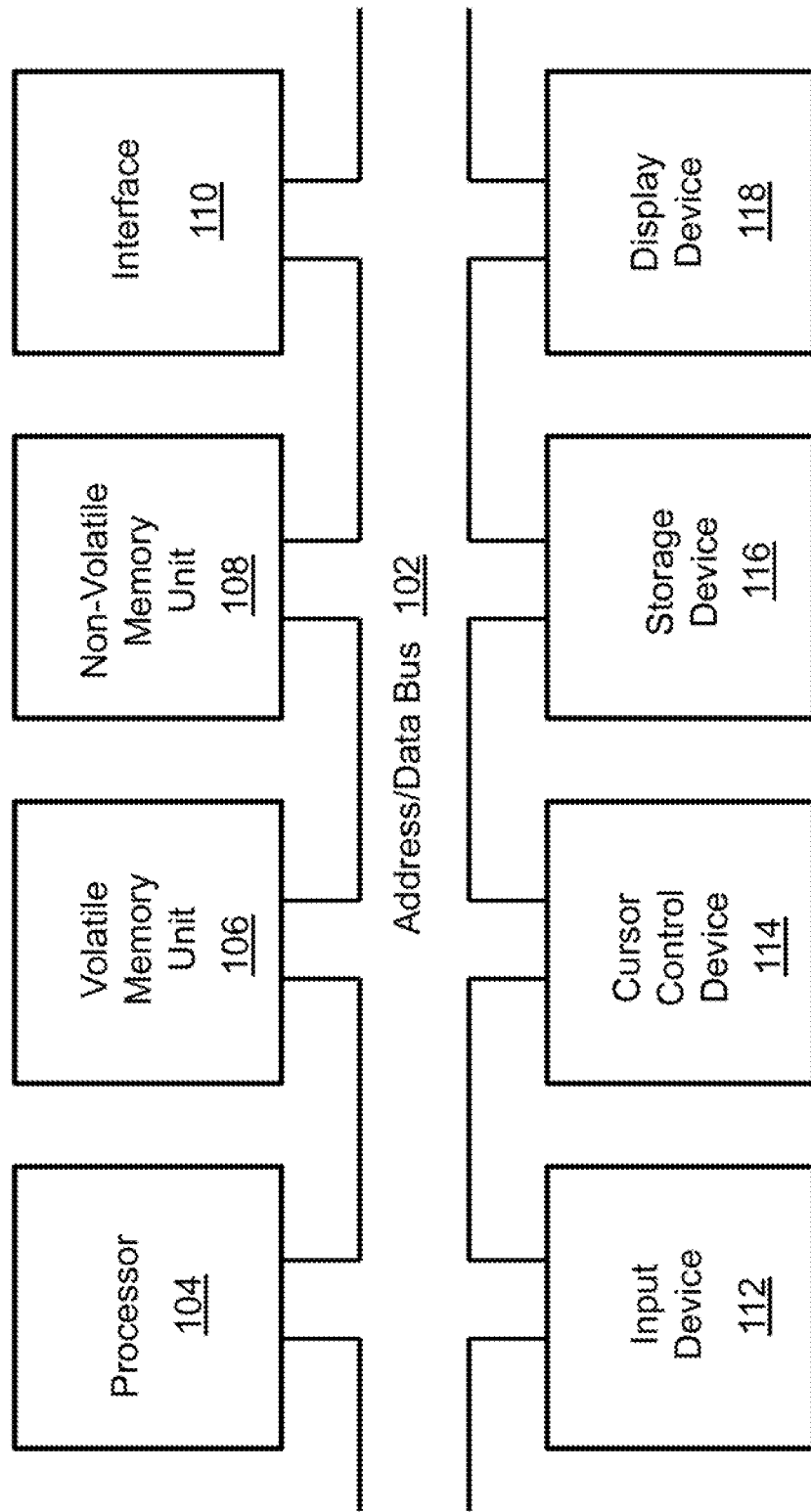
FIG. 1 is a block diagram depicting the components of a system for competitive seeding of opinion dynamics in network settings according to some embodiments of the present disclosure.

The present invention relates to a system for competitive seeding of opinion dynamics in network settings and, more particularly, to a system for competitive seeding of opinion dynamics that incorporates both thresholding and gossip-style behaviors. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of some embodiments of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of some embodiments of the present invention is provided. Finally, specific details of various embodiments of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Morris H. DeGroot. Reaching a consensus. Journal of the American Statistical Association, 69(345):118-121, March 1974.
2. Sanjeev Goyal, Hoda Heidari, and Michael Kearns. Competitive contagion in networks. Games and Economic Behavior, 2014.
3. Benjamin Golub and Matthew O. Jackson. Naïve learning in social networks and the wisdom of crowds. American Economic Journal: Microeconomics, 2(1):112-149, February 2010.
4. David Kempe, Jon Kleinberg, and E'va Tardos. Maximizing the spread of influence through a social network. In Proceedings of the ninth ACM SIGKDD international conference on Knowledge discovery and data mining, KDD '03, pages 137-146, New York, N.Y., USA, 2003. ACM.
5. John Nash. Non-cooperative games. Annals of Mathematics, 54(2):286-295, 1951.
6. R. Olfati-Saber, J. A. Fax, and R. M. Murray. Consensus and cooperation in networked multi-agent systems. Proceedings of the IEEE, 95(1):215-233, January 2007.
7. Charu C. Aggaral and ChengXiang Zhai. A Survey of Text Classification Algorithms. In: Aggarwal C., Zhai C. (eds) Mining Text Data. Springer, Boston, Mass., 2012.

(2) PRINCIPAL ASPECTS

Various embodiments of the invention include three "principal" aspects. The first is a system for competitive seeding of opinion dynamics in a network setting. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
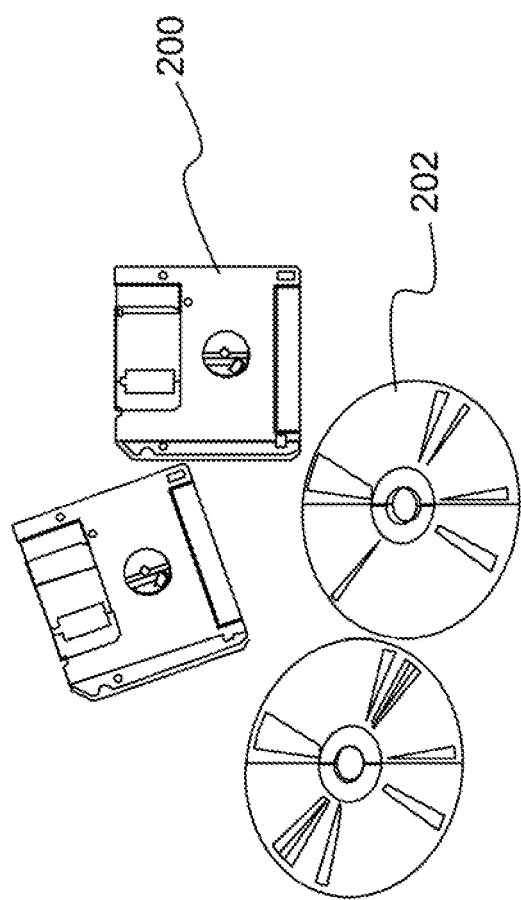
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS OF THE INVENTION

Described is a system using a game theoretic model for the competitive seeding of opinion dynamics in network settings. Competitive seeding models have been studied before; however, the system according to embodiments of the present disclosure describes how the opinions spread through a network. The opinion dynamic described herein describes a complex diffusion dynamic that incorporate both thresholding and gossip-style behaviors.

The system described herein models a process by which competing firms (e.g., advertising agencies, political campaigns, manufacturers) target a small number of individuals (e.g., customer accounts, user accounts such as for a social media network) in a networked population in order to seed a word-of-mouth diffusion of opinions. The opinion dynamic, which describes how this word-of-mouth spreads, employs a unique combination of threshold-style and gossip-style dynamics. Some of the advantages of this opinion dynamic include: the ability to model diffusion behavior that is not captured by commonly used threshold dynamics, and the ability to model the DeGroot consensus dynamic as a special case (see Literature Reference No. 1 for a description of the DeGroot consensus dynamic).

In the competitive aspect of the model according to embodiments of the present disclosure, where one must specify how an individual node chooses between two or more competing opinions, a switching-selection technique inspired by Goyal, Heidari, and Kearns (see Literature Reference No. 2) is employed. The switching-selection technique according to embodiments of the present disclosure is used to generalize the thresholding activation methodology of Kempe, Kleinberg, and Tardos (see Literature Reference No. 4) to a setting in which there are multiple, mutually exclusive activation "types" or opinions, so that active nodes are identified by one of the competing players' types/opinions.

For example, if the players represent cellular phone providers, the nodes are potential customers (e.g., potential customer accounts) embedded in a social network, and an active individual corresponds to an individual (e.g., an individual account) who has purchased a cell phone. In game theoretic models, "players" refers to the strategic agents, such as individuals, firms, agencies, or campaigns. Then, the "type" of activation corresponds to the service provider that the customer has signed a contract with. In the switching-selection dynamic according to embodiments of this disclosure, there is a switching function that decides at each time step whether an inactive node switches from inactive to active, and a selection function that determines which type/opinion that a newly activated node adopts. The switching-selection model disclosed in Literature Reference No. 2 retains the above-mentioned limitation found in the threshold model of Kempe, Kleinberg, and Tardos (see Literature Reference No. 4) where influence only moves from active nodes to inactive nodes. Prior work references nodes to "fully commit" before they are able to pass information along to their neighbors. In the model according to embodiments of the present disclosure, nodes can pass along information prior to fully committing.

(3.1) The Model

This section formalizes an m-player model of strategic seeding of influence dynamics in a social network. The players are "outside" of the network. The set of players is denoted using $\mathcal{P} = \{1, \ldots, m\}$. The players are given a social network represented by a weighted, directed graph $G=(V, E)$. Each edge $(u, v) \in E$ in the graph has a positive edge weight $0 < w(u,v) \leq 1$, and it is required that for each node $v \in V$, $E_{(u,v) \in E} W(u, V) = 1$. That is, for each node $v$, it is required that the sum of their incoming edge weights equals one.

Each node $v$ in the network maintains an opinion (state) vector $X^v = (x_1^v, \ldots, x_m^v)$ with an entry for each player $i \in P$. $x^v(t)$ is used to refer to $v$'s state at time $t$. It is required that for all $t = 0, 1, \ldots$ that $0 \leq x_i^v(t) \leq 1$ for $i \in \mathcal{P}$, and that the sum of an individual node's opinions is at most one (i.e., $|x^v(t)|_1 = \Sigma_{i \in \mathcal{P}} x_i^v(t) \leq 1$.

A strategy for player $i \in \mathcal{P}$ is a subset $S_i \subseteq V$ of cardinality at most $b_i$, where the $b_i$'s are exogenous game parameters. The vertices selected in $S_i$ serve as player $i$'s seed vertices— the vertices $v$ for which $i$ has direct influence on $x^v(0)$ in the initialization step of the opinion dynamics. Specifically, let $y^i = y_1^i, \ldots, y_m^i)$ be player $i$'s seed opinion, with $y_i^i = 1$ and $y_j^i = 0$ for $j \neq i$. For a node $v$, denote $\mathcal{P}_v = \{i | v \in s_i\} \subseteq \mathcal{P}$ to be the subset of players that includes $v$ in their seed strategies. The opinion dynamics are initialized by setting the opinions for each $v \in V$ and all $i \in \mathcal{P}$ to be $$x_i^v(0) = \begin{cases} \frac{1}{|\mathcal{P}_v|} \sum_{j \in \mathcal{P}_v} y_i^j & \text{if } \mathcal{P}_v \neq \emptyset \\ \varepsilon & \text{otherwise} \end{cases} \quad (1)$$

for all $i \in P$ where $0 < \varepsilon << 1/M$ is a small constant. The requirement that $\varepsilon$ is non-zero is so that some utility functions (like the relative opinion utility defined below in Equation (7)) are well defined. Equation (1) specifies the initial opinion of a seed node $v$ to be the average seed opinion of the players that chose $v$ as a seed node, and the initial opinion of all non-seed nodes is initialized to a vector with every entry equal to $\varepsilon$.

(3.1.1) Dynamics

The opinion dynamics of this disclosure are inspired by a unique combination of the DeGroot consensus dynamic (described in Literature Reference Nos. 1 and 6) and the threshold diffusion model of Kempe, Kleinberg, and Tardos (see Literature Reference No. 4). In addition to the opinion vectors of the prior art, in some embodiments, each node is also described by a binary state of active or inactive. Each node holds an opinion with respect to the m players. The opinion vector is a way to represent the m opinions, such that the i'th entry in the vector corresponds to the node's opinion towards player i. The distinction between active and inactive nodes is that inactive nodes are allowed to update their opinions, while the opinions of active nodes is fixed at the time of their activation. However, unlike the update dynamics employed by Kempe, Kleinberg, and Tardos (see Literature Reference No. 4) that only allows for inactive nodes to be influenced by active nodes, the opinion dynamics according to embodiments of the present disclosure allow inactive nodes to be influenced by both active and inactive nodes.

The opinion dynamics proceed in discrete time steps t=1, 2, ..., T before terminating at some (exogenously specified, possibly infinite) time T. The dynamics at each time step t involves two steps: an influence step and a stochastic action step. Briefly, the influence step involves updating every inactive node's opinion based on their previous opinion and the opinions of their neighbors, and the action step involves deciding whether an inactive node becomes activated and, if so, to which player does it commit to as a function of their currently held opinions. The action step also updates the nodes opinion, making them a zealot toward their selected player i so that their opinion becomes: $x_i^v(t')=1$ and $x_j^v(t')=0$ for all $j \neq i$ and all $t'>t$.

(3.1.1.1) The Influence Step

The influence step updates the opinion of an inactive node v at time t to be a weighted sum of their previous opinion at time t−1 and the average of their neighbors' opinions at time t−1;

$$x_i^v(t)=(1-\alpha)x_i^v(t-1)+\alpha \Sigma_{u|(u,v) \in E} w(u,v) \cdot x_i^u(t-1) \quad (2)$$

for all $i \in P$, where $0<\alpha<1$ is an exogenous game parameter.

The intuition behind the influence step is that nodes (which represent individuals in a society) influence their neighbors directly, and non-neighbors indirectly through long-distance "friend-of-a-friend" relationships. The form of Equation (2) is based on the well-studied consensus dynamic attributed to DeGroot (see Literature Reference No. 1)

(3.1.1.2) The Action Step

The action step involves a node v becoming activated and, once active, committing to one of the players i. These two operations are characterized by a switching probability density function $f(\cdot)$ that dictates whether a node becomes active, and a selection probability density function $g(\cdot)$ that dictates to which player an active node becomes "committed to" (or "a zealot of"). If node v becomes committed to player i at time t, set $x_j^v(t')=1_{\{j=i\}}$ for all $j \in P$ and $t'=t+1, t+2, \ldots, T$. The notation $1_{\{X\}}$ is used to be a function that returns a 1 whenever condition X is true, and a 0 otherwise. This way, once a node becomes activated, its opinion is updated to reflect its new role as a zealot and then no longer gets updated (however it may still influence the subsequent opinions of other nodes).

The switching function $f:[0,1] \rightarrow [0,1]$ specifies the probability that node v will become activated as a function of the "combined weight" of their current (at time t) opinions (i.e., $$\Pr[v \text{ is activated}]=f(|x^v(t)|_1)=f(\Sigma_{p \in P} x_p^v(t)).$$

It is required that $f$ is non-decreasing and $f(0)=0$. The following are some example realizations of $f(\cdot)$ that can be used:

the linear switching function, $f(|x^v(t)|_1=|x^v(t)|_1$;
the exponential switching function, $f(|x^v(t)|_1==(|x^v(t)|_1)^s$ for some constant $s>0$; and
the threshold switching function, $$f(|x^v(t)|_1) = \begin{cases} 1 & \text{if } |x^v(t)|_1 \geq \theta_v \\ 0 & \text{otherwise} \end{cases} \quad (3)$$

where $0<\theta_v \leq 1$ is a (possibly randomized) exogenously specified quantity (cf., the threshold model of Kempe et al. (see Literature Reference No. 4). The selection function $g:[0,1]^{|P|} \times P \rightarrow P$ stochastically selects the player $p \in P$ that an activated node selects based on their opinions at time t (i.e., $\Pr[v \text{ selects player } p]=g(x^v(t),p)$. The following are non-limiting examples of realizations of $g(x^v,p)$ to determine the probability that an activated node v with opinions $x^v=x^v(t)$ selects player $p \in P$:

Let $P' \stackrel{def}{=} \arg \max_{p \in P} \{x_p^v\}$ be the set of one or more plays that node v holds the highest opinion(s) for. Then the max selection function is defined to be:

$$g(x^v, p) = \begin{cases} 1/|P'| & \text{if } p \in P' \\ 0 & \text{otherwise.} \end{cases}$$

The proportional selection function $$(x^v, p) = \frac{x_p^v}{\sum_{q \in P} x_q^v}. \quad (4)$$

The softmax selection function $$(x^v, p) = \frac{e^{x_p^v/\tau}}{\sum_{q \in P} e^{x_q^v/\tau}}, \quad (5)$$

for some constant $\tau>0$.

(3.1.2) Outcomes and Utilities

When the dynamics halt after $\tau$ time steps, each node v is left with an opinion vector $x^v(T)$. The nodes' opinions are aggregated into the player utility function. The utility function is the objective that each player is independently trying to maximize. For example, if the utility is "get the most votes", then both players attempt to get the most votes for themselves. This is a kind of zero-sum utility. All players use the same utility function, but it is different with respect to the individual player. For instance, player i wants the most votes for player i, and player j wants the most votes for player j. Described below are two utility functions, each representing a different aggregation rule.

The commitment utility specifies that the utility for a player is determined by the fraction of nodes that commit to (become zealots toward) the player by the time the dynamics halt at time T Let $Z_i(t)=\{v \in x_i^v(t)=1\} \subseteq V$ be the set of activated nodes that have committed to player i. The commitment utility is defined as:

$$\pi_i^{zel}(s) = \frac{1}{n}|Z_i(T)|. \quad (6)$$

The relative opinion utility specifies that the utility for a player is determined by the sum of the relative opinion values held by each of the nodes toward that player at time T according to the following:

$$\pi_i^{zel}(s) = \frac{1}{n} \sum_{v \in V} \frac{x_i^v(T)}{|x^v(T)|_1}. \quad (7)$$

Notice that $\pi^{zel}$ implies a zero-sum game since for any strategy profile s, $\Sigma_{i \in P} \pi_i(s)=1$. The relative opinion value is the fraction term in the sum of equation (7).

(3.2) Properties

The following describes some properties of the diffusion dynamic and the influence game based on the dynamic described herein. The results in this section are obtained using the threshold switching function defined by Equation (3), the proportional selection function defined in Equation (4), and the commitment utility function, $\pi^{zel}$, defined in Equation (6). As such, all references to utility $\pi_i(\cdot)$ in this section should be understood to refer to the commitment utility function, $\pi_i^{zel}(\cdot)$.

(3.2.1) Diffusion

Figure 3A:
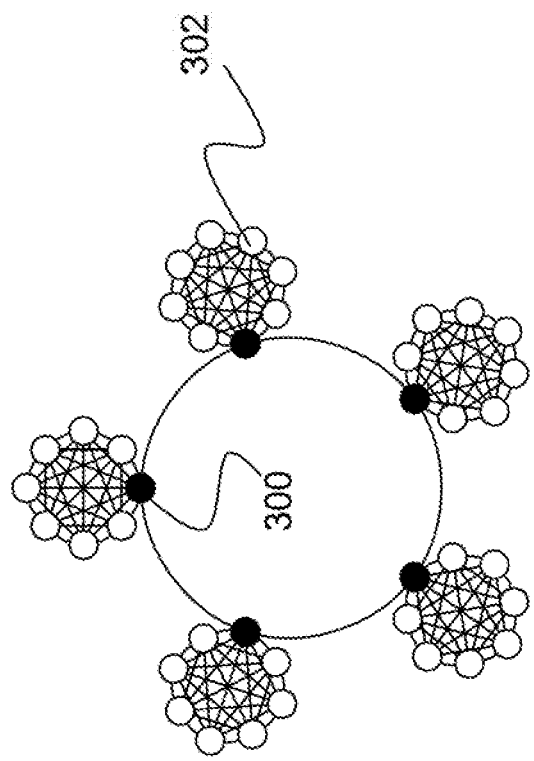
FIG. 3A is an illustration of a modular network in which some nodes have high thresholds and other nodes have low thresholds according to some embodiments of the present disclosure.
Figure 3B:
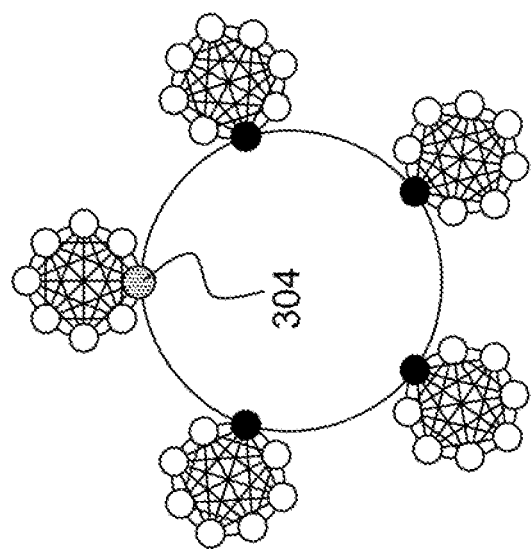
FIG. 3B is an illustration of a modular network in which a single player has seeded a single node according to some embodiments of the present disclosure.
Figure 3C:
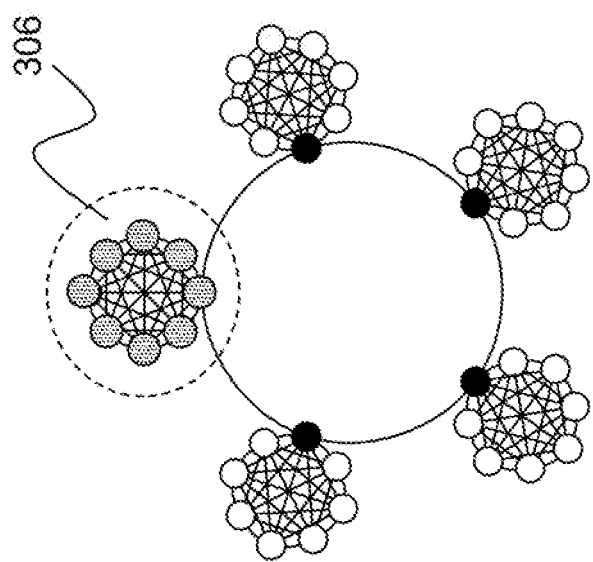
FIG. 3C is an illustration of diffusion proceeding according to a standard threshold model.

The diffusion dynamics can result in interesting phenomena that cannot be observed in other threshold-based models. One such phoneme is a so-called "echo chamber", depicted in FIGS. 3A-3D. Consider the modular network in FIG. 3A in which the black nodes (e.g., filled circle 300) have high thresholds of 8/9, and the white nodes (e.g., unfilled circle 302) have low thresholds of, for instance, 1/100. Suppose that there is a single player, and they seed a single node shown in (e.g., pattern filled circle 304) in FIG. 3B. If the diffusion proceeds according to a "standard" threshold model, as described in Literature Reference No. 4, then the activations spread only throughout the module of the graph (element 306) that contains the initially seeded node, as shown in FIG. 3C. A "module" in this context is a densely connected group of nodes with sparse connections to nodes outside of the group. This is because the high-threshold nodes behave as firewalls to their respective modules, prohibiting the spread of activations. This is a consequence of the stipulation that the threshold model's dynamics only spread via activated nodes.

Figure 3D:
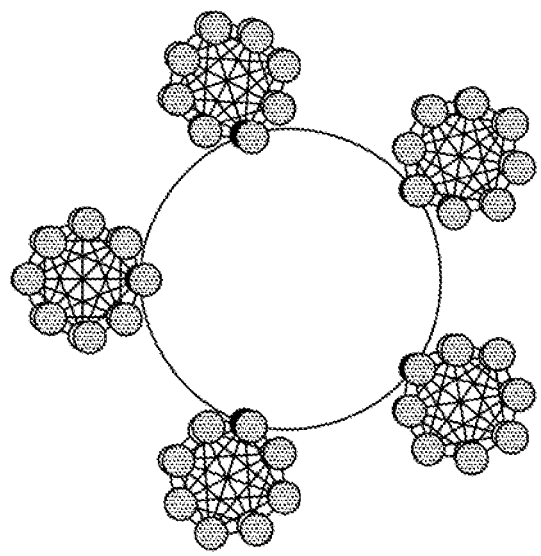
FIG. 3D is an illustration of the entire network becoming activated by the single seeded node according to some embodiments of the present disclosure.

In contrast, the dynamics of the system according to embodiments of the present disclosure result in the entire network becoming activated (see FIG. 3D, represented by all of the nodes in each of the modules being pattern-filled).

Nodes can have heterogeneous thresholds. The high thresholds are relative to the thresholds of other nodes. Since the dynamics allow inactive nodes to influence their neighbors, the high-threshold nodes that once acted as firewalls, preventing further activations, now act as gateways that relay activations from a neighboring module into their own. This example is referred to as an "echo chamber" because it is the high-threshold nodes (that are initially not influenced enough to activate) that are responsible for the initial "flow" of opinions into their respective module. Then, since the low-threshold nodes in the module are immediately activated by the opinions diffused through the inactive high-threshold gateway node, the high-threshold node soon finds that enough of their neighbors have become activated (and, consequently, zealots) so that there is enough collective influence exerted onto them that they, too, finally activate.

(3.2.2) Influence Game

The first result involves the existence of pure strategy Nash equilibria in the competitive seeding game. Recall that a (pure) Nash equilibrium is a strategy profile $s=(S_1, \ldots, s_m)$ such that, for every player $i \in \mathcal{P}$ and every deviation s' that differs from s only in the ith entry, there is $\pi_i(s) \geq \pi_i(s')$.

The existence of mixed strategy Nash equilibrium is guaranteed by the fact that the joint strategy space is finite (see Literature Reference No. 5). However, the existence of pure strategy Nash equilibrium is not guaranteed in the influence game.

Proposition 1. Pure strategy Nash equilibria are not guaranteed to exist.

The next two results address the computational complexity of finding a best-response strategy. A best-response strategy for a player $i \in \mathcal{P}$ given the strategy profile $s_{-i}$, comprising the strategies of every other player $j \neq i$, is a strategy $s_i^*$ that satisfies $$s_i^* \in \underset{s_i}{\mathrm{argmax}} \{\pi_i(s_i, s_{-i})\}.$$

Proposition 2. The computational complexity of finding a best-response strategy is NP-hard.

It was also observed that the utility function $\pi_i(\cdot)$ is neither monotonic nor submodular, which rules out the possibility of a greedy approximation algorithm finding a $(1-1/e)$ approximate best-response.

(3.2.3) Practical Application

This invention can be used in the practical application of implementing policy decisions on how to handle the seeding of social media content given its information diffusion dynamics and the influence of the individual poised to seed it. In this application, a social media user has a message that they wish to share/post. When the user submits the message, m is transmitted to a server where it is analyzed (e.g., using text classification algorithms, c.f., Ref 7) to determine it's categorical topic, and the information spreading dynamics that are associated with messages of its type. Depending on the outcome of this analysis and the influence centrality of the user, the message is either allowed to be posted to social media (in which case it is forward to the social media service provider's server to appear on its platform) or it is blocked and not forwarded to the social media platform.

For a concrete example, suppose that a very influential user wants to post content that is includes a call to violence against a particular group, and there exists a policy that seeks to prevent the dissemination of such material. The application described above would successfully block the user's ability to post this content.

(3.3) Demonstration Software

Figure 4A:
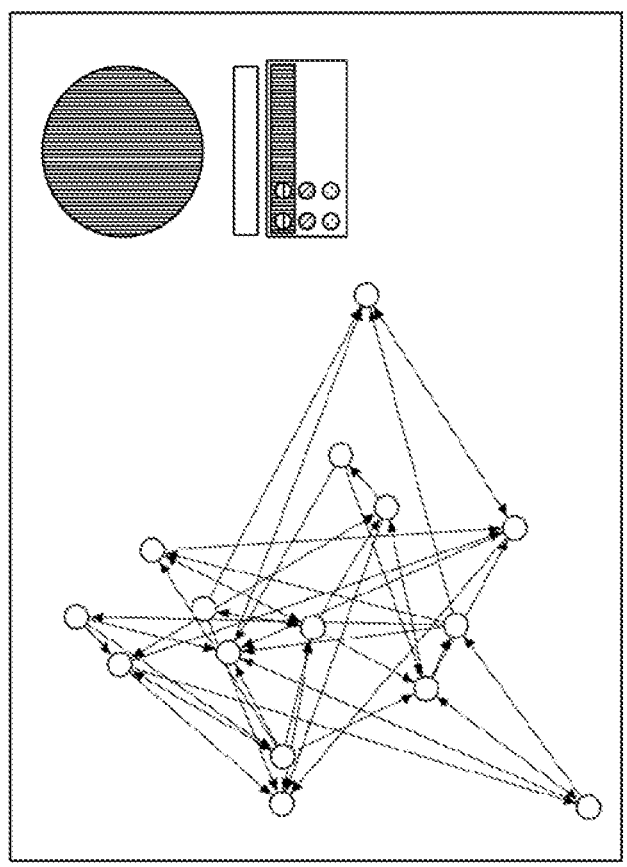
FIG. 4A is an illustration of a graph prior to seed selection according to some embodiments of the present disclosure.
Figure 4B:
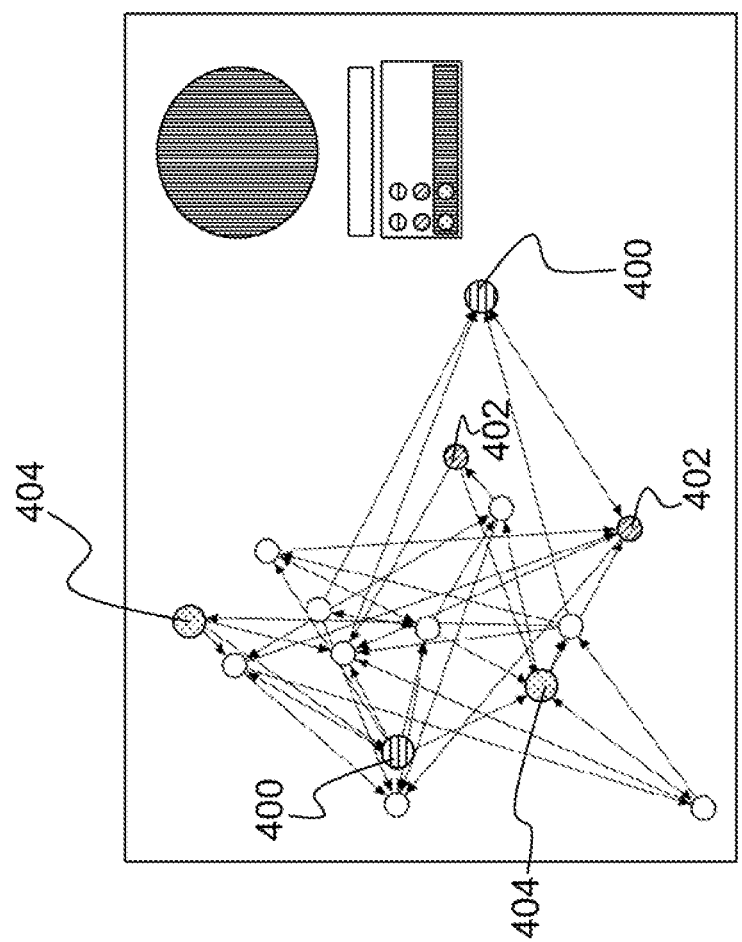
FIG. 4B is an illustration of the graph after the players' seeds have been selected according to some embodiments of the present disclosure.
Figure 4C:
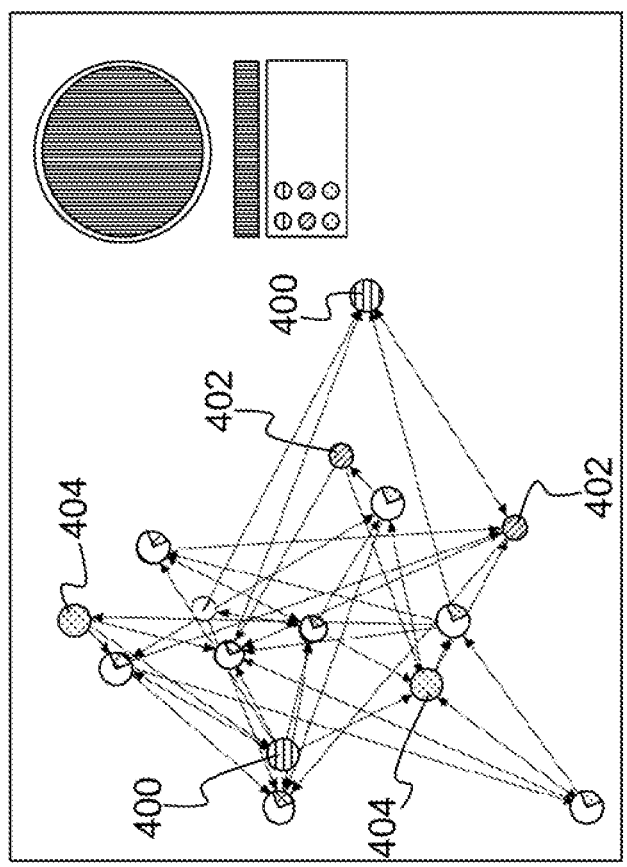
FIG. 4C is an illustration of an early moment of diffusion dynamics according to some embodiments of the present disclosure.
Figure 4D:
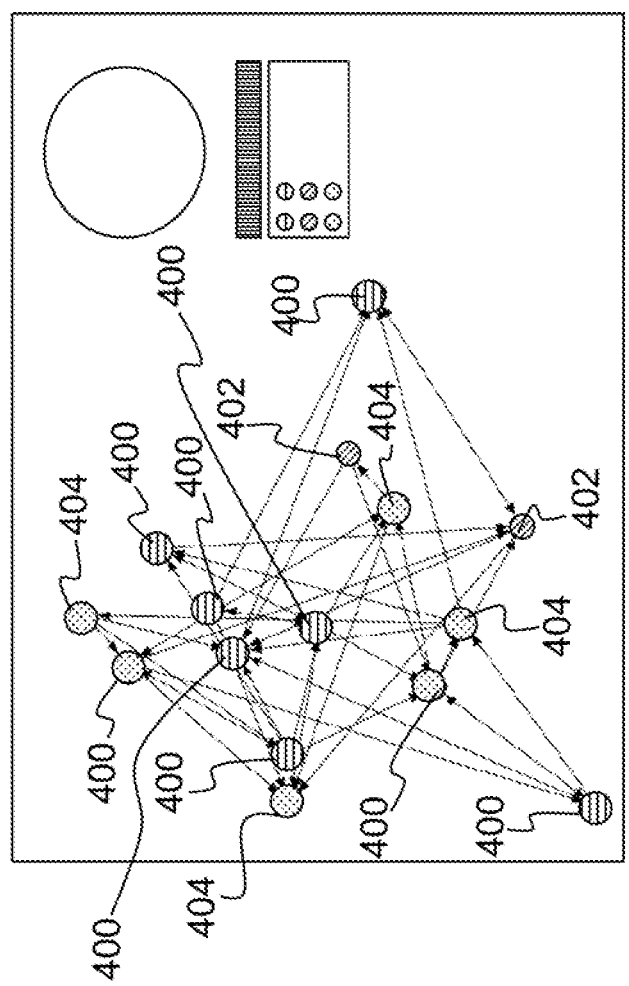
FIG. 4D is an illustration of the final state of the diffusion process after the dynamics halt according to some embodiments of the present disclosure.

The strategic influence game based on the diffusion dynamics according to embodiments of the present disclosure was implemented in demonstration software. This software, which includes an interactive graphical user interface, examples of which are depicted in FIGS. 4A-4D, allows users to experiment with different graphs and parameter settings. Screen shots of the demonstration software configured with three players (each player identified by a horizontal striped circle 400, diagonal striped circle 402, or dot-filled circle 404) with seed budgets of two apiece, and a random 20 node graph. FIG. 4A shows the graph prior to seed selection, and FIG. 4B shows the graph after the players' seeds have been selected. FIG. 4C captures an early moment of the diffusion dynamics (as indicated by some of the nodes being partially filled with dots or stripes), while FIG. 4D shows the final state of the diffusion process after the dynamics halt. The software also includes functionality to simulate best-response dynamics and a number of heuristic algorithms, such as greedy algorithms or linear programming (LP) relaxations, for finding approximate best-response strategies.

Some embodiments are broadly applicable for product manufacturer customer centers, social media centers, or commercial centers to increase information diffusion and social contagions, such as product purchases, joining an enthusiast group, forwarding news/articles, and becoming fans of a social media website page. The system according to embodiments of the present disclosure can be used by an advertising firm or product manufacturer to identify competitive seeding of opinion dynamics that spread through networks (social networks or online social networks) via an interactive graphical user interface. After identifying the spread of opinion dynamics, the product manufacturer can have a social media center cause an advertisement or political message, for instance, to be displayed to users on a social media webpage. A non-limiting example of a scenario is the purchase of an expensive product, where a customer may take a while to contemplate his/her personal preferences and product attributes and compare the brand with competing brands. The system can be used by a firm to cause an advertisement for the expensive product to be displayed to a user on a social media web site page or news website page.

Figure 5:
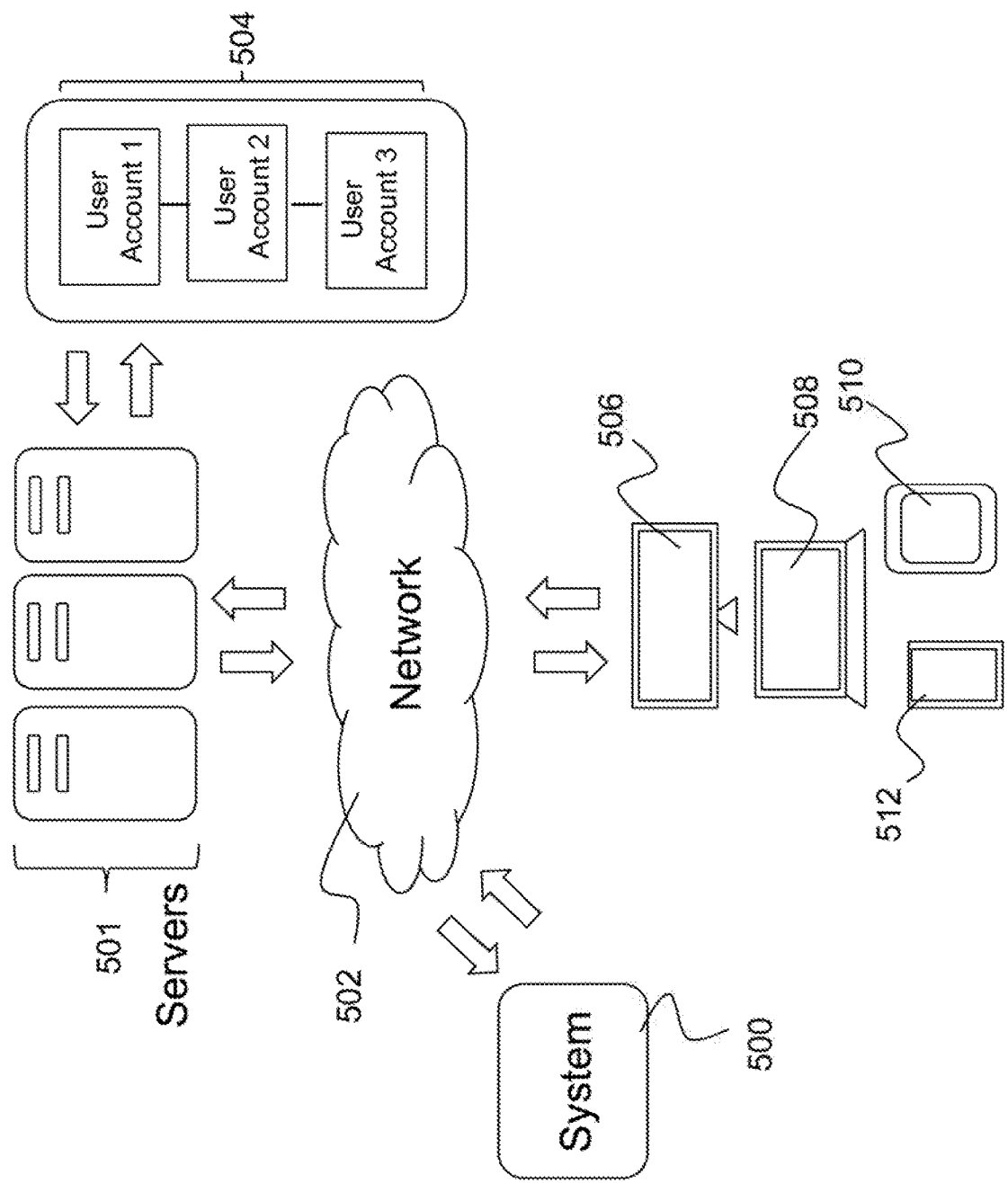
FIG. 5 is an illustration of hardware communications in the system for competitive seeding of opinion dynamics according to some embodiments of the present disclosure.

As shown in FIG. 5, the system 500 according to embodiments of the present disclosure can connect with servers 501 for social network platforms to access information or automatically provide targeted advertisements to a display screen on a communication device (elements 506, 508, 510, 512) via a social network account or website (element 504). The system 500 can connect via a network 502 to servers 501 to send and receive information relating to various social media networks of interconnected user accounts (element 504) that are accessed via mobile and non-mobile devices, non-limiting examples of which include desktops 506, laptops 508, iPhones 510, and Android mobile devices 512. Non-limiting examples of user accounts (element 504) include Facebook® user accounts and Twitter® user accounts. As can be appreciated by one skilled in the art, the user device is any device that can receive and transmit data via the network 502. Additionally, a user account may be a user account of a social media platform, which may or may not be capable of receiving targeted marketing.

Figure 6:
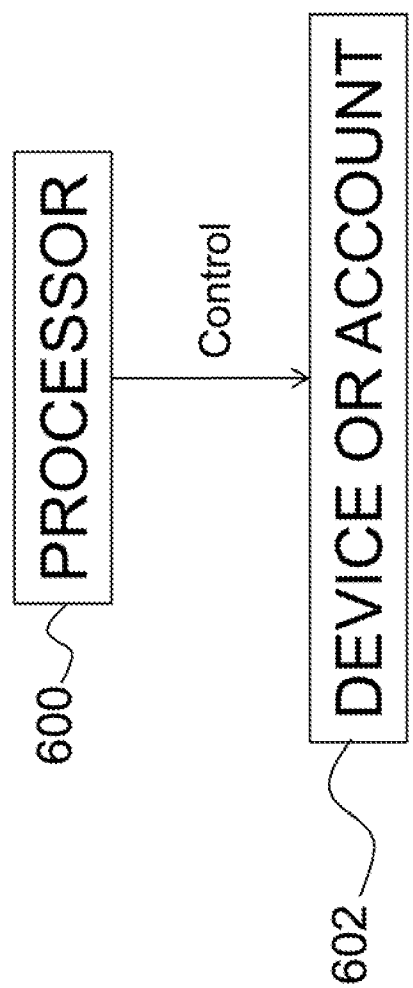
FIG. 6 is a flow diagram illustrating control of devices based on the identification of how opinions spread according to some embodiments of the present disclosure.

FIG. 6 is a flow diagram illustrating using a processor 600 to control a device 602 based on the identification of how opinions spread. Non-limiting examples of devices 602 that can be controlled via the processor 800 include social networking hardware and a manufacturing machine. The knowledge of which dynamics are at play can be used to implement a filtering policy that controls the information that a device (e.g. smartphone, tablet, laptop computer, desktop computer) or account (e.g., user account) is allowed to post to a social media platform (e.g., Facebook™, Twitter™) using social networking hardware (i.e., the device 602). The filtering policy would act to disconnect a user from the social media platform or block a user from posting content to the social media platform.

In another example, social networking hardware can be caused to send a social networking message to one or more members of the social network to optimize wider or faster adoption of a selected opinion. The message may be targeted based on location of a user account. The location of the user account can be determined via geolocation of the mobile device or desktop computer of the user, which ties the social networking message to a physical location. As understood by one skilled in the art, geolocation is the identification or estimation of the real-world geographic location of an object, such as a radar source, mobile phone, or Internet-connected computer terminal. As can be appreciated by one skilled in the art, control of other device types is also possible.

In addition, the processor 600 may control a device 602, where the device 602 is a manufacturing machine that is adjusted via the processor 600. For instance, given an expected spread of public opinion regarding a possible purchase, manufacturing decisions about what to manufacture or in what style, may be used to adjust what and how many operations the manufacturing machine performs.

Furthermore, the system can be applied to increase brand loyalty where there are competing brands and the company tries to retain its customers so that the customers don't switch to other brands. In both of these scenarios, the system described herein can be used to recommend advertising strategies to manufacturer customer centers, social media centers, and commercial centers.

An additional example is spreading certain positive ideas or images about a product or a company across a social media network, wherein the opinion of the consumer product is at least one of a positive message and a positive image related to the consumer product and/or a company that sells the consumer product. Some embodiments have the potential to maximize the spread with some fixed budgets. For instance, if the player is only allowed to seed a fixed number of nodes, the fixed number is the "budget".

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for identifying and controlling how opinions spread through a social media network, the system comprising:
   one or more processors and a non-transitory computer-readable medium having executable instructions encoded thereon such that when executed, the one or more processors perform operations of:
   identifying how opinions spread through the social media network by:
      applying opinion dynamics to a model of the social media network comprising a plurality of nodes, each node representing an opinion, resulting in a set of opinion dynamics data; and
      employing a switching selection technique for specifying how an individual node chooses between two or more competing opinions;
      wherein each node is described by an active state or an inactive state such that inactive nodes can update their opinions, and active nodes are fixed in their opinion at the time of activation,
      wherein inactive nodes can be influenced by both active nodes and inactive nodes;
      wherein the opinion dynamics proceed in discrete time steps, and the opinion dynamics at each time step comprises:
         an influence step for updating each inactive node's opinion based on a previous opinion of the inactive node and the opinions of neighboring nodes, and
         a stochastic action step for determining whether an inactive node becomes activated and, if so, to which player does the inactive node commit to as a function of the node's current opinion; and using the set of opinion dynamics data, analyzing a message submitted by a user of the social media network; and based on the analysis and a determined topic of the message, forwarding the message to a social media service provider server to appear on the social media network, or preventing the message from being posted to the social media network by not forwarding the message to the social media service provider server.

2. The system as set forth in claim 1, wherein the influence step updates the opinion of an inactive node to be a weighted sum of the inactive node's previous opinion and an average of the opinions of neighboring nodes.

3. The system as set forth in claim 1, wherein when the opinion dynamics halt after T time steps, the one or more processors further perform an operation of aggregating the plurality of nodes' opinions into a player utility function.

4. The system as set forth in claim 3, wherein a commitment utility function specifies that a utility of a player is determined by a fraction of nodes that commit to the player.

5. The system as set forth in claim 3, wherein a relative opinion utility function specifies that the utility for a player is determined by the sum of relative opinion values held by each of the nodes that are committed to the player at time T.

6. A computer program product for identifying and controlling how opinions spread through a social media network, the computer program product comprising:

a non-transitory computer-readable medium having executable instructions encoded thereon, such that upon execution of the instructions by one or more processors, the one or more processors perform operations of:

identifying how opinions spread through the social media network by:

applying opinion dynamics to a model of the social media network comprising a plurality of nodes, each node representing an opinion, resulting in a set of opinion dynamics data; and employing a switching selection technique for specifying how an individual node chooses between two or more competing opinions;

wherein each node is described by an active state or an inactive state such that inactive nodes can update their opinions, and active nodes are fixed in their opinion at the time of activation, wherein inactive nodes can be influenced by both active nodes and inactive nodes;

wherein the opinion dynamics proceed in discrete time steps, and the opinion dynamics at each time step comprises:

an influence step for updating each inactive node's opinion based on a previous opinion of the inactive node and the opinions of neighboring nodes, and a stochastic action step for determining whether an inactive node becomes activated and, if so, to which player does the inactive node commit to as a function of the node's current opinion; and using the set of opinion dynamics data, analyzing a message submitted by a user of the social media network; and based on the analysis and a determined topic of the message, forwarding the message to a social media service provider server to appear on the social media network, or preventing the message from being posted to the social media network by not forwarding the message to the social media service provider server.

7. The computer program product as set forth in claim 6, wherein the influence step updates the opinion of an inactive node to be a weighted sum of the inactive node's previous opinion and an average of the opinions of neighboring nodes.

8. The computer program product as set forth in claim 6, wherein when the opinion dynamics halt after T time steps, the one or more processors further perform an operation of aggregating the plurality of nodes' opinions into a player utility function.

9. The computer program product as set forth in claim 8, wherein a commitment utility function specifies that a utility of a player is determined by a fraction of nodes that commit to the player.

10. The computer program product as set forth in claim 8, wherein a relative opinion utility function specifies that the utility for a player is determined by the sum of relative opinion values held by each of the nodes that are committed to the player at time T.

11. A computer implemented method for identifying and controlling how opinions spread through a social media network, the method comprising an act of:

causing one or more processors to execute instructions encoded on a non-transitory computer-readable medium, such that upon execution, the one or more processors perform operations of:

identifying how opinions spread through the social media network by:

applying opinion dynamics to a model of the social media network comprising a plurality of nodes, each node representing an opinion, resulting in a set of opinion dynamics data; and employing a switching selection technique for specifying how an individual node chooses between two or more competing opinions;

wherein each node is described by an active state or an inactive state such that inactive nodes can update their opinions, and active nodes are fixed in their opinion at the time of activation, wherein inactive nodes can be influenced by both active nodes and inactive nodes;

wherein the opinion dynamics proceed in discrete time steps, and the opinion dynamics at each time step comprises:

an influence step for updating each inactive node's opinion based on a previous opinion of the inactive node and the opinions of neighboring nodes, and a stochastic action step for determining whether an inactive node becomes activated and, if so, to which player does the inactive node commit to as a function of the node's current opinion; and using the set of opinion dynamics data, analyzing a message submitted by a user of the social media network; and based on the analysis and a determined topic of the message, forwarding the message to a social media service provider server to appear on the social media network, or preventing the message from being posted to the social media network by not forwarding the message to the social media service provider server.

12. The method as set forth in claim 11, wherein the influence step updates the opinion of an inactive node to be a weighted sum of the inactive node's previous opinion and an average of the opinions of neighboring nodes.

13. The method as set forth in claim 11, wherein when the opinion dynamics halt after T time steps, the one or more processors further perform an operation of aggregating the plurality of nodes' opinions into a player utility function.

14. The method as set forth in claim 13, wherein a commitment utility function specifies that a utility of a player is determined by a fraction of nodes that commit to the player.

15. The method as set forth in claim 13, wherein a relative opinion utility function specifies that the utility for a player is determined by the sum of relative opinion values held by each of the nodes that are committed to the player at time T.

16. The system as set forth in claim 1, wherein the opinion spread is related to one of a message and an image about one of a consumer product and a company.

\* \* \* \* \*